Aug. 20, 1968

J. T. ZELLERS, JR 3,397,974

SHEET GLASS APPARATUS

Filed Nov. 13, 1962

INVENTOR.
James T. Zellers, Jr.
BY Nobbe & Swope
ATTORNEYS

INVENTOR.
James T. Zellers, Jr.
BY Nobbe & Swope
ATTORNEYS

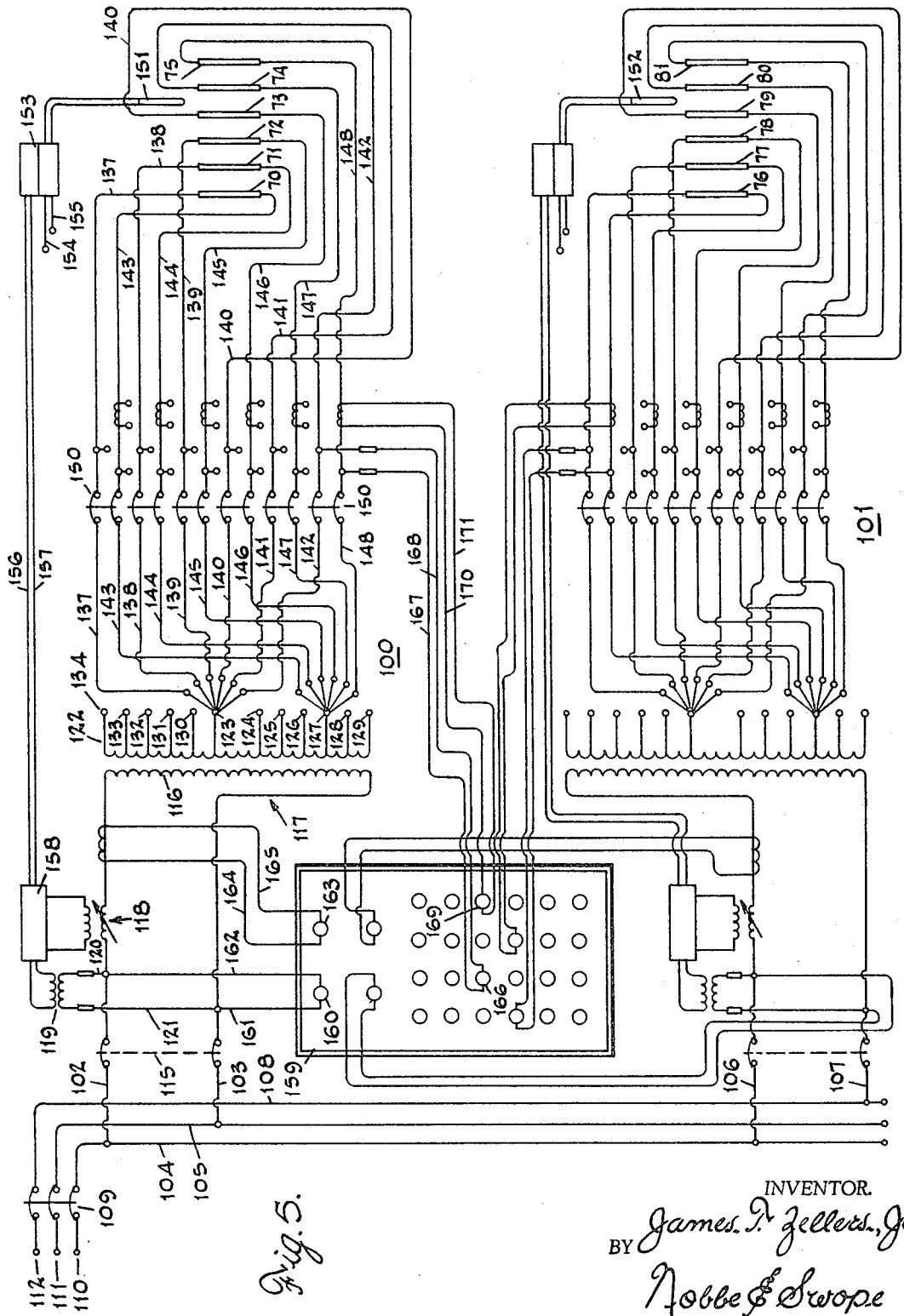

3,397,974
Patented Aug. 20, 1968

3,397,974
SHEET GLASS APPARATUS
James T. Zellers, Jr., Charleston, W. Va., assignor to Libbey-Owens-Ford Glass Company, Toledo, Ohio, a corporation of Ohio
Filed Nov. 13, 1962, Ser. No. 237,146
3 Claims. (Cl. 65—162)

ABSTRACT OF THE DISCLOSURE

Apparatus for heating the draw pot of a Colburn window glass machine by electrical energy. A plurality of electrical resistance heating elements are positioned in the heating chamber beneath the draw pot, and temperature sensing units within the heating chamber control the temperature of corresponding heating elements to thereby control the temperature pattern of the molten glass in the draw pot.

---

The present invention relates broadly to the manufacture of sheet or window glass and more particularly to improvements in heating a bath of molten glass from which a continuous sheet or ribbon is drawn.

This invention is of particular utility in controlling the temperature of the bath of molten glass contained in the so-called draw pot of a Colburn-type glass drawing machine, in which a continuous sheet or ribbon is drawn upwardly from the bath of molten glass, deflected horizontally about a bending roll and passed horizontally into and through an annealing lehr.

A principal object of this invention is the provision of improved means for heating the draw pot by electrical energy in a manner to maintain the bath of molten glass therein within the optimum range of working temperature.

Another object of the invention is the provision of improved means for heating the draw pot solely by electrical energy to maintain the molten glass in said draw pot at a substantially uniform temperature wehreby to obtain a material decrease in distortion in the finished sheet.

Another object of the invention is the provision of improved means for heating the draw pot including a plurality of tubular electrical heating elements of silicon carbide mounted in the pot chamber and constituting the sole heating means therefor.

A further object of the invention is the provision of means for automatically controlling the operation of the electrical heating elements including means for controlling the voltage output thereto, and means for selectively regulating the voltage output to each of said electrical heating elements to individually increase or decrease the electrical energy supplied thereto.

Other objects and advantages of the invention will become more apparent during the course of the following description when taken in connection with the accompanying drawings.

In the drawings, wherein like numerals are employed to designate like parts throughout the same:

FIG. 5 is a diagrammatic view of an electrical circuit for controlling the electrical heating elements;

Figure 1:
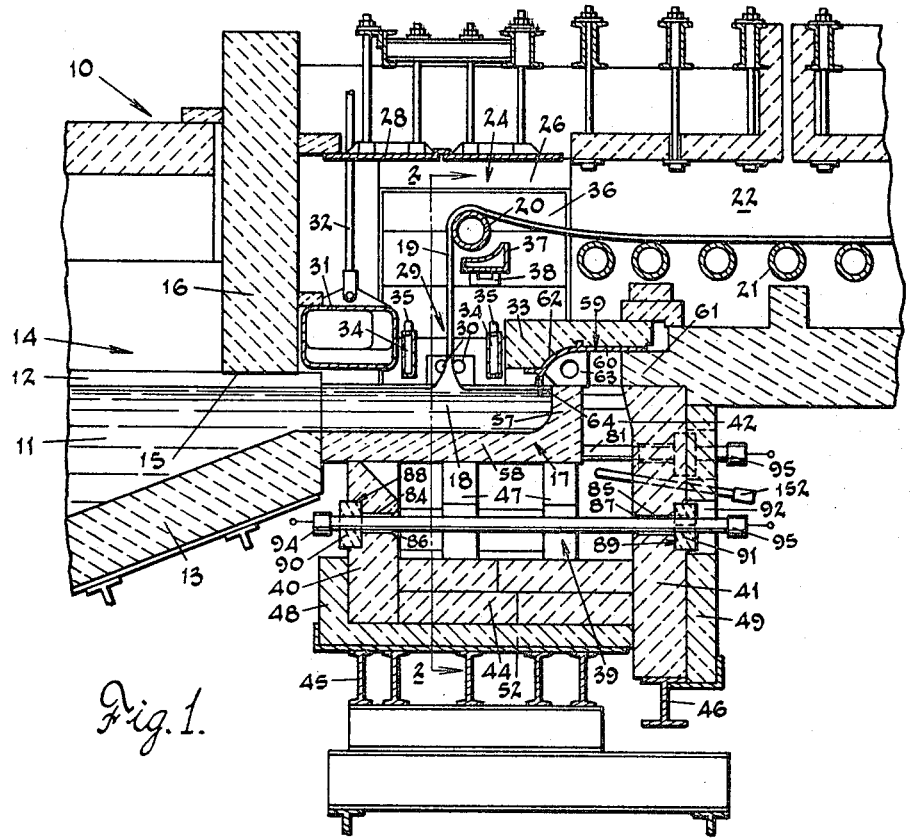
FIG. 1 is a longitudinal vertical sectional view of a sheet glass drawing furnace embodying the improved heating means provided by the present invention.

With reference now to the drawings and particularly to FIG. 1, the numeral 10 designates the outlet end of a continuous glass melting tank furnace in which a mass of molten glass is melted, refined and cooled to proper working temperature. The molten glass, indicated by the numeral 11, flows through a channel defined by the side walls 12 and floor 13 of the cooling chamber 14 in said outlet end and beneath the outlet arch 15 of the furnace end wall 6 into a relatively shallow working receptacle or draw pot 17 to form a relatively shallow bath or pool of molten glass 18 from which a sheet or ribbon 19 is continuously drawn.

According to one method of sheet glass manufacture, commonly referred to as the Colburn process, the sheet 19 is drawn vertically upward from the bath of molten glass and then deflected about a bending roll 20, while still in a semi-plastic condition, although substantially set in its final sheet form, and passed over a series of conveyor rolls 21 through a flattening chamber 22 and into and through an annealing lehr (not shown).

Generally speaking, in drawing machines of this character, the bending roll 20 is located in a draw chamber 24, adjoining the flattening chamber 22 and is defined by the furnace end wall 16, side walls 26 and 27 and a roof 28. As the newly formed sheet is drawn upwardly the edges thereof pass between oppositely disposed pairs of rotatable knurled rolls 30 which establish and maintain the actual width of the sheet.

Arranged above the bath of molten glass at opposite sides of the sheet are the cover or lip-tiles 31 and 33. Thus, a so-called "front" lip-tile 31 is positioned above the entry end of the draw pot, where it is supported by rods 32 between the side walls 26 and 27 and relatively close to the furnace wall 16. A "rear" lip-tile 33 is situated in spaced relation to and above the rear end of the draw pot 17 and is supported in a manner to be hereinafter more fully described.

Within the working area 29 between the front and rear lip-tiles 31 and 33, respectively, are located cooling devices 34 through which a coolant, such as water or air, is continuously circulated to effect a desired cooling of the glass sheet 19. The sheet coolers 34 are arranged in spaced relation to the opposite surfaces of the sheet and are supported at their ends by the coolant supply pipes 35 which project outwardly through panel enclosures 36 forming structural parts of the chamber side walls 26 and 27. For substantially the same purpose, a cooler 37 may be provided beneath the bending roll 20 to shield the lower exposed surface of the roll from currents of highly heated air moving upwardly from the working area 29 through which the glass ribbon is initially drawn. The cooler 37 is carried at its opposite ends by coolant supply pipes and/or support members 38 extended through the panel enclosures 36 and, by reason of the circulation of coolant through the cooler, the atmosphere adjacent the roll is reduced in temperature which also results in exerting a cooling influence on the roll surface.

The draw pot 17 is relatively shallow and is generally supported in a substantially closed pot chamber 39 which is heated to maintain the molten glass therein at the desired working temperature. In accordance with the present invention, the pot chamber 39 is constructed with a forward wall 40, a rear wall 41, oppositely disposed side walls 42 and 43 and a bottom wall or floor 44. As viewed in FIGS. 1 and 2, the floor 44 is supported upon structural beams 45 thus supporting the walls 40, 42 and 43 while the rear wall 41 is substantially independently carried by structural beam 46. Stools 47 for supporting the draw pot 17, are arranged in transverse and equally spaced parallel relation on the floor 44 so that upon vertical movement of the floor, the elevation of the draw pot 17 can be adjusted without necessitating shifting of the rear wall 41. It will, of course, be appreciated that the abutting end surfaces of the floor 44 and the side walls 42 and 43 are suitably sealed, as by cement or like materials, to the rear wall to provide a substantially tight pot chamber. In this connection, it will be noted that each of the walls 40, 41, 42 and 43 and the floor 44 of the pot chamber 39 are provided with an outer layer of insulation material 48, 49, 50, 51 and 52, respectively, to reduce heat loss therefrom as well as to prevent objectionable cooling of the walls by the relatively lower temperature of the surrounding atmosphere.

Figure 3:
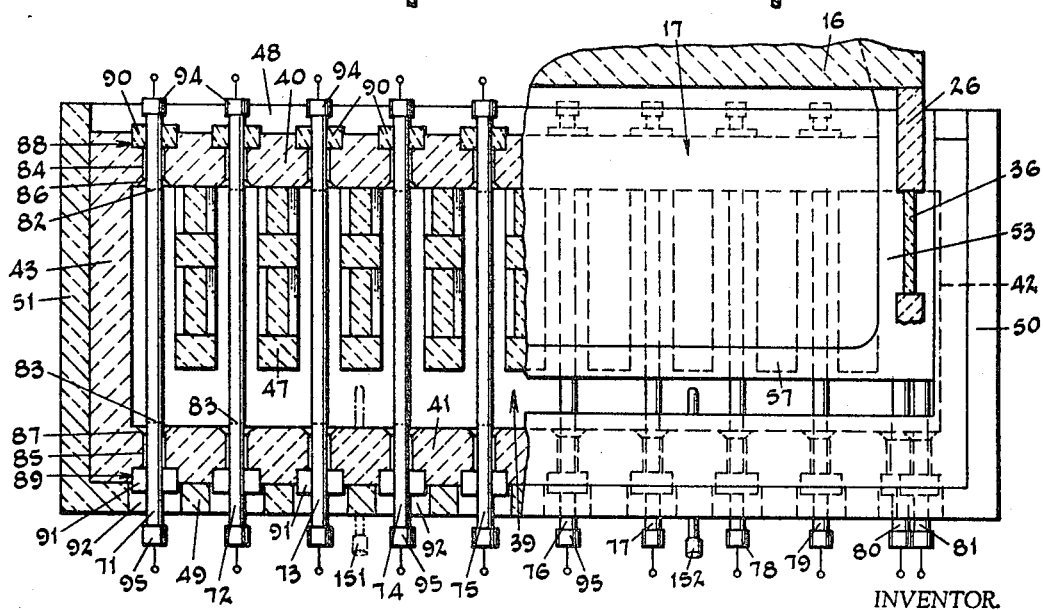
FIG. 3 is a horizontal sectional view taken on line 3—3 of FIG. 2.
Figure 2:
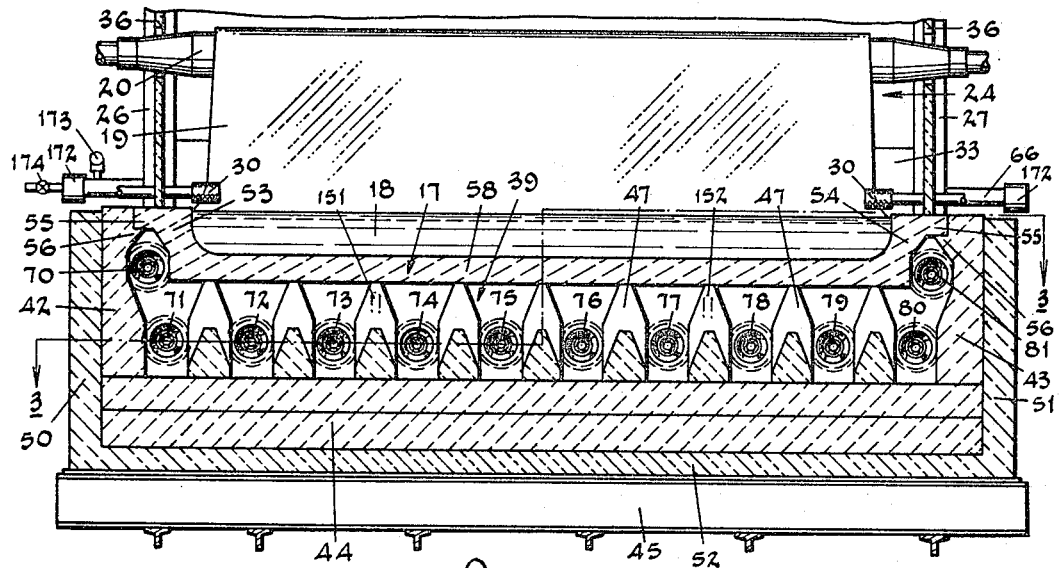
FIG. 2 is a transverse vertical sectional view taken on line 2—2 of FIG. 1.

As shown in FIGS. 2 and 3, the side walls 53 and 54 of the draw pot are formed with outwardly directed flanges 55 which are supported on ledges 56 provided in the said upper surfaces of side walls 42 and 43. Thus, the draw pot 17 is entirely enclosed within the pot chamber 39, with the pot side walls 53 and 54 in spaced relation to the respective chamber side walls 42 and 43 and the end wall 57 of the pot in spaced relation to the adjacent chamber wall 41.

Figure 4:
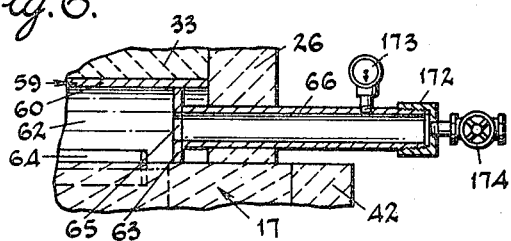
FIG. 4 is a detail sectional view.

The rear lip-tile 33 is located above and in spaced relation to the end wall 57 of the draw pot and is supported by a metal panel 59. The panel 59 is formed with a substantially flat portion 60, carried on the floor structure 61 of the chamber 22, and a downwardly curved portion 62 supported above end wall 57 by longitudinally spaced, vertically disposed plates 63 resting on the upper surface of said end wall. Secured to the forward edge of the downwardly curved portion 62 of the panel 59 is a metallic strip 64 adapted to be immersed in the bath of molten glass 18 adjacent the end wall 57. The strip 64 spans the width of the draw pot and thus serves to effectively seal the pot chamber 39 from the draw chamber 24. Since the panel 59 is exposed to and heated to substantially the temperature of the pot chamber, it is preferably made of a material of high heat conductivity, such as stainless steel, whereby the attached strip 64 will transmit sufficient heat into the molten glass to reduce cooling thereof along the end wall 57 of the draw pot. To minimize the corrosive effect of the molten glass upon the sealing strip 64, it is preferably made of "Hoskins Metal" and welded to the panel 59. Each of the vertical plates 63 is formed with an aperture 65 and, in the case of the endmost plates, as seen in FIG. 4, tubular members or pipes 66 are provided through which suitable rods can be inserted when the lip-tile and panel are bodily mounted in the draw chamber. The pipes 66 project outwardly through the walls of the draw chamber and, as will be more fully hereinafter described, can be equipped to seal the pot chamber from the outside atmosphere as well as to regulate the pressure therein.

In carrying out the invention, the pot chamber is heated solely by electrical energy and for this purpose electrical heating elements of silicon carbide are employed. One such type of electrical heating element commercially available is sold under the trademark "Globar" by the Carborundum Co., Niagara Falls, N.Y. This particular element or unit is tubular in structure and is formed of a silicon carbide having a substantially reliable heating factor within the range of 2800° F. This particular type of heating element is also formed with oppositely disposed mounting end portions having a lower resistance factor in order that more critical heating areas of higher resistance will be located in the central portion of the heater with consequent less heat loss at the ends. These heating elements can be rapidly installed, easily regulated and quickly and conveniently removed for replacement.

Heretofore it has been customary to heat the draw pot chamber by means of gas burners, with the gas flames being projected into the chamber through openings in the side walls thereof. This type of heating has not proven entirely satisfactory because of the difficulty of maintaining the bath of molten glass in the draw pot at a substantially uniform temperature, particularly across the width of the pot. This ununiformity of glass temperature has resulted in variations in the thickness of the sheet being drawn which produces distortion in the finished sheet. It has been found, however, that by heating the pot chamber solely by electrical energy and particularly by the use of silicon carbide electrical heating elements in accordance with the present inevntion, it is now possible not only to maintain the bath of molten glass in the draw pot at the desired working temperature, but also to maintain the glass at a more uniform temperature. This has resulted in a material decrease in distortion in the finished sheet.

Another advantage to be gained by heating the draw pot solely by electrical heating means is that it is possible to substantially completely seal the pot chamber and thereby maintain a more uniform temperature therein. This is not possible with the use of gaseous heat where means must be provided to permit the escape of products of combustion. This also has an adverse affect on the uniformity of heating in that the escape of the products of combustion carries with it a certain amount of heat. Due to fluctuations in the gas supply coupled with loss of heat with the products of combustion, it has been found that the operating efficiency of the electrical heating elements is considerably greater than that of combustible gas. With the electrical heating means herein provided there are no products of combustion since the electrical heating elements provide a dry radiant heat.

Upon reference to FIGS. 1 and 2, it will be seen that the tubular electrical heating elements 71 to 80 are arranged in spaced parallel relation and extend substantially horizontally between the front wall 40 and rear wall 41 of the pot chamber 39. The heating elements are disposed substantially midway between the floor 44 of the pot chamber and the bottom of the draw pot and also between the rows of pot stools 47. More particularly, the heating elements are preferably supported a distance of from 7½ to 9 inches beneath the bottom 58 of the draw pot and at center to center distances of approximately 14 inches, to provide uniform distribution of heat beneath the draw pot. Additional electrical heating elements 70 and 81 are arranged opposite and in spaced parallel relation to the side walls 53 and 54, respectively, of the draw pot adjacent the upper ends of the side walls 42 and 43 of the pot chamber.

Each of the heating elements 70–81 is of sufficient length to project at its opposite ends through the openings in the front and rear walls 40 and 41 of the pot chamber 39; the junctions between the element sections of high resistance within the chamber and low resistance passing through the said walls being indicated by the broken lines 82 and 83. To suitably receive the heating elements, walls 40 and 41 are provided with aligned openings 84 and 85 formed at their inner ends with conical-shaped portions 86 and 87. This conical shaping at the inner ends of the respective openings materially reduces deterioration of the wall in proximity to the high resistance central section of each heating element. At its outer end, each opening 84 and 85 is formed with an enlarged annular counterbore or recess 88 and 89, respectively, in which is received a refractory collar to support the heating element in axially spaced relation to the wall of the opening. This reduces the length, at each end of the heating element, that is in contact with the wall structure to reduce heat transmission and additionally affords a quickly removable mounting for the element. Thus, an annular collar 90 is inserted over the end of each heating element passing through the forward wall 40 and received in a respective recess 88. At the opposite or rear wall 41, a split collar 91, formed of mating semi-circular halves, is employed so that the upper half can be removed for inspection of the heating element or unit, within the pot chamber, when desired. It will also be noted that the lower resistance portion at this end of each element is relatively longer than at the opposite end to project the same distance through openings 92 in the layer 49 of insulation. At their opposite ends, the heating elements 70–81 are equipped with connector couplings 94 and 95 by which they are connected in circuit with a controlled source of electrical energy as will be hereinafter more fully explained.

As herein employed, the heating elements 70–75, operating as one "bank" of heat sources, are disposed on one side of the longitudinal axis of the draw pot 17 and connected to a source of electrical energy through one operative automatic control system while the heating elements 76–81, operating as a second "bank" on the opposite side of the draw pot axis, are connected to the electrical source through a duplicate automatic control system. This, as will be more fully hereinafter described, provides a very flexible control to maintain the molten glass in the draw pot at a uniform optimum working temperature while affording convenient and effective means for selectively and individually regulating the power output to each heating element. Thus, as illustrated diagrammatically in FIG. 5, the heating elements 70–75 are connected through a control and supply system, generally designated by the numeral 100, to a source of electrical energy while the heating elements 76–81 are connected through a duplicate control system 101. Generally speaking, the control system 100 is connected through lines 102 and 103 to source lines 104 and 105 and the system 101 is similarly connected through lines 106 and 107 to source lines 104 and 108; the circuitry of source lines 104, 105 and 108 being opened and closed by the multiple contacts of breaker switch 109 to the three phase supply lines 110, 111 and 112.

Since the two control systems 100 and 101 are of duplicate character, reference is directed particularly to the system 100 and the following description is to be considered exemplary of both systems. Thus, the lines 102 and 103 are connected through breaker switch 115 to the input side 116 of a transformer 117. The voltage output of this transformer is monitored by a variable saturable reactor 118 in line 102 which in turn is operatively supplied control power through transformer 119 connected to lines 102 and 103 by lines 120 and 121. The side 122 of transformer 117 has an output capacity within a range, as for example, of 72 to 352 volts and is equipped with taps, from a medial low capacity of 72 volts as at taps 123 and 124, through taps 125, 126, 127, 128 and 129 and oppositely disposed taps 130, 131, 132, 133 and 134 to the maximum capacity. By way of illustration, the taps 125–129 increase the voltage output in increments of 8 volts while the taps 130–134 increase said output in larger increments of 48 volts although such mentioned voltages may not comprehend the actual required electrical service nor are they to be considered in any way restrictive to the spirit of the invention. As herein described and in the early use of the heating elements, an initial supply of approximately 96 volts has been found to be entirely satisfactory and for this purpose the line circuit of each heating element is connected to the tap 123 and to tap 127. Thus, the heating elements 70–75 are connected by lines 137, 138, 139, 140, 141 and 142 to tap 123 and by lines 143, 144, 145, 146, 147 and 148 to tap 127. The circuits of lines 137–143 to element 70, 138–144 to element 71, 139–145 to element 72, 140–146 to element 73, 141–147 to element 74 and 142–148 to element 75 are individually controlled by breaker switch 150.

As above stated, the heating elements have a thermal factor of 2800° F. and, in practical use, the heat output and that which is reflected in the viscosity of the molten glass at optimum working temperature is usually within the range of 2300°–2500° F. This range of temperature is automatically controlled, in the system 100, by the provision of thermocouple 151 and thermocouple 152 in the duplicate system 101. As shown in FIG. 3, three thermocouples are mounted in the rear wall 41 and are generally spaced from the longitudinal axis of the draw pot 17 as to be located between heaters 73–74 and 77–78, respectively. The thermocouple 151 is connected to the activator side of a thermal control unit 153 which is supplied by 110 volt service lines 154 and 155. The control side of unit 153 is completed by lines 156 and 157 to the amplifier 158 of the saturable reactor 118. The thermocouple thus operates to transmit the range of temperature existent in the pot chamber 39, and acting upon the draw pot 17, to the heating element 153 and thereby to the reactor 118 to adjust the voltage to the input side 116 of the transformer 117. This, of course, raises or lowers the actual power output to the heater elements arranged beneath the bottom 58 and along the side walls 53–54 of the draw pot with resultant increase or decrease in the temperature of the molten glass.

In the event that cold streak areas develop or become localized in the bath of molten glass or it becomes necessary to elevate the temperature of the glass in the vicinity of one or more of the heating elements, the line voltage through the circuits to such particular heating elements is selectively increased by connecting the related circuit line or lines to adjoining taps. This will individually increase the voltage output from the transformer. For instance, line 139 for heating element 72 can be disengaged from tap 123 and connected to tap 130 thereby increasing the voltage output to an individual total of 144 volts. On the other hand, line 145 when removed from tap 127 can further modify the resulting output in increments of 8 volts by connection of the line at taps 125 and 126 or taps 128 or 129. This will serve to decrease or increase the adjusted total of 144 volts.

In this respect, the selective connection of the circuits of the heating elements can be employed to further advantage in the case of the heating elements 70 and 81 located, as above described, along the side walls 53 and 54 of the draw pot 17. By increasing the voltage output to these particular heating elements, the thermal condition of the adjacent side walls will prevent cooling of the molten glass in these side areas of the pot with the result that the undesired formation of devitrified glass or "dogmetal" will be reduced if not eliminated. Thus, connection of line 137 to any of taps 130–134 or line 143 to taps 128 or 129 will increase the output to heating element 70 controlled by the system 100 which is also true with regard to element 81 associated with the control system 101.

Selective connection of the above described circuits 137–148 to taps 123–134 can also be employed during initial installations or replacements of the heating elements in the event that the indicated power rating of one or more of the elements is above or below a common average of the remainder of the heating elements to be used. Likewise, where it is found that a heating element is becoming aged and that the resistance of the center section has become altered, the required additional power to balance this heating arrangement can be supplied in progressively increased amounts by the connection of the associated circuit lines to the taps through which increased voltage can be obtained.

To visually monitor on the operable condition of the control systems 100 and 101, there is provided a panel 159 for physical mounting of switches 109, 115 and 150 as well as for metering devices associated with the circuitries of the systems. Thus, primary voltmeter 160 is connected by lines 161 and 162 into lines 120 and 121 and primary ammeter 163 is connected by lines 164 and 165 into line 102. Individual monitoring of the line circuit of each heating elements is similarly provided and by way of example voltmeter 166 is connected by lines 167 and 168 across lines 142 and 148 for heating element 75 while ammeter 169 is connected by lines 170 and 171 to circuit line 148.

As heretofore mentioned, the pipes 66, attached to the end plates 59, project outwardly through the walls of the draw chamber 24 and can be employed to regulate the pressure within the pot chamber 39. In this connection, it has also been noted that the pot chamber is substantially sealed and that the walls thereof are further covered by layers of insulation which results in a relatively stable atmosphere. Due, however, to unavoidable ingress of cold air through joints in the chamber walls and the natural expansion of this air upon being heated, the pressure in the pot chamber, unless controlled, may rise above desired operating limits. Therefore, to maintain a suitable operating pressure within the chamber, the outer end of each pipe 66 is closed by a cap 172. At one side of the furnace, a gage 173 is provided in the respective pipe 66 and a valve 174 is connected in the cap 712. Accordingly, the existing pressure in the pot chamber can be determined by the gauge 173 and regulated by the valve 174. By this manner of control, the pressure within the chamber can be maintained within a preferred operating range.

Figure 6:
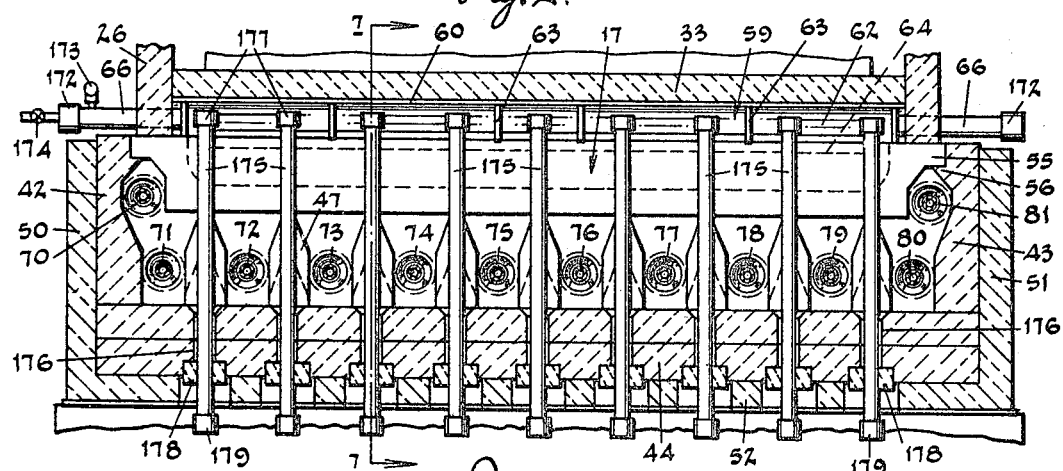
FIG. 6 is a transverse sectional view of a modified form of the invention.
Figure 7:
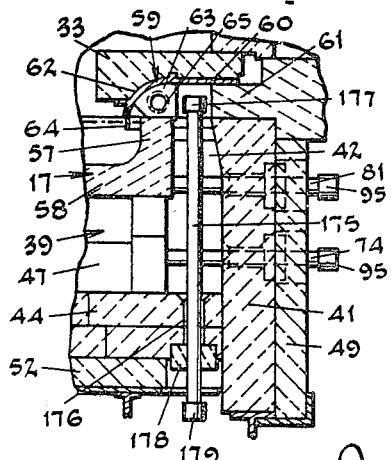
FIG. 7 is a transverse vertical sectional view taken on line 7—7 of FIG. 6.

Referring now to FIGS. 6 and 7, there is illustrated a modified arrangement for heating the draw pot 17 in which the heating source is increased by the provision of vertically disposed electric heating elements 175 similar to the electrical heating elements 70–81. Although the use of vertical heating elements 175 with the horizontally disposed heating elements 70–81 is not always necessary their use has been found advantageous in connection with draw pots of exceptional width and particularly to afford increased heating of the rear wall 57 of the draw pot. This will operate to prevent cooling of the molten glass in the rear area of the drawpot and thereby maintain the temperature of the glass compatible with the desired range of temperature at the base or meniscus of the upwardly drawn sheet or ribbon. The provision of the vertically disposed heating elements also improves the heating of the pot bottom 58 adjacent the rear wall 57.

Each of the several vertical heating elements 175 is passed through an opening 176 in the bottom wall 44 of the pot chamber and is adapted to be inserted at its upper end into a connector coupling 177. The lower end of each heating element is likewise axially located in the respective opening 176 by a refractory collar 178. Outwardly of the insulation layer 52, the heating elements 175 are engaged by couplings 179 and supported beneath the floor 44 in any suitable manner (not shown). As in the case of the heating elements 70–81, the heating elements 175 are operatively connected to a control and supply system such as the representative systems 100 and 101 of FIG. 5.

In practice, the electrical heating elements 70–81, as illustrated particularly in FIGS. 1, 2 and 3, are inserted through the related pairs of aligned openings 84 and 85 in the chamber walls 40 and 41 and are supported in spaced relation to the walls of the openings by the colars 90 and 91 inserted over their oppositely disposed end portions of lower resistance. The outer end of each recess 88 and 89 can then be closed, if desired, by a suitable heat-resistant insulation packing material to further seal the pot chamber 39. As hereinabove described, the ends of the heating elements 70–81 are connected to their respective control and supply systems 100 and 101 by the couplings 94 and 95 and as indicated in FIG. 5 through circuit lines 137 to 148.

By the provision of the electrical sources of heat within the sealed pot chamber 39, it is possible to maintain the draw pot 17 and molten glass therein at a more closely controlled uniform temperature since there is a little necessity to vent the chamber as has heretofore been found necessary for the escape of waste gases. Also, the development of cold areas or "streaks" through the bath of molten glass which result in objectionable thick and thin areas in the glass ribbon can be materially reduced, if not eliminated, by increasing the power requirements to one or more of the heating elements along the affected area or areas of the draw pot. This, as aforementioned in connection with FIG. 5, is easily and quickly effected by selectively varying the circuit connections of the heating elements at the taps of transformer 117 to modify their individual voltage output.

Additionally, the eventual or inadvertent failure of a heating element, for one reason or another, does not result in an undesirable reduction of the normal working temperature within the pot chamber since each heating element can be individually replaced without disconnecting the remaining heating elements from the related electric control and supply system. Thus, upon opening of the associated switch 150, the line circuit to one heating element can be opened whereupon the connector couplings can be removed and a substitution of the element rapidly made. This, together with individual modification of the effective electric output to each heating element, renders the embodiments of this invention very well adapted to a flexible control to constantly maintain the bath of molten glass in the draw pot within the desired range of working temperature.

It is to be understood that the forms of the invention herewith shown and described are to be taken as illustrative embodiments only of the same, and that various changes in the shape, size and arrangement of parts may be resorted to without departing from the spirit of the invention.

I claim:

1. In apparatus for producing sheet glass wherein the sheet is drawn upwardly from a relatively shallow bath of molten glass contained in a draw pot and said draw pot is received in a heating chamber located therebeneath and defined by a bottom wall, front and back walls, and opposite side walls, the improvement comprising a plurality of individual electrical resistance heating elements located in said heating chamber and connected to a source of electrical energy for heating said draw pot and said shallow bath of molten glass therein solely by electrical energy, temperature sensing units associated with each of said individual heating elements within said heating chamber, and means responsive to said sensing units for controlling the heat output of corresponding ones of said heating elements and thereby the temperature pattern of said molten glass in said draw pot.

2. Apparatus for producing sheet glass as claimed in claim 1, in which said heating elements comprise a plurality of elongated tubular elements extending longitudinally of said heating chamber in spaced parallel relation thereacross, said heating elements being supported adjacent their ends in said front and back walls of said heating chamber.

3. Apparatus for producing sheet glass as claimed in claim 2, wherein the side walls of said heating chamber are spaced from the corresponding side walls of said draw pot, the improvement comprising additional elongated electrical heating elements extending substantially horizontally within the space between the side walls of said draw pot and heating chamber.

References Cited

UNITED STATES PATENTS

| | | | |
|---|---|---|---|
| 1,615,842 | 2/1927 | Hitner | 65—203 |
| 1,836,409 | 12/1931 | Trinks et al. | 65—203 |
| 2,006,167 | 6/1935 | Hohmann | 65—196 X |
| 2,252,756 | 8/1941 | Byers | 13—6 X |
| 3,223,502 | 12/1965 | Ward et al. | 65—203 X |

DONALL H. SYLVESTER, *Primary Examiner.*

R. L. LINDSAY, *Assistant Examiner.*

UNITED STATES PATENT OFFICE
CERTIFICATE OF CORRECTION

Patent No. 3,397,974                              August 20, 1968

James T. Zellers, Jr.

It is certified that error appears in the above identified patent and that said Letters Patent are hereby corrected as shown below:

Column 1, line 41, "wehreby" should read -- whereby --.
Column 4, line 7, "inevntion" should read -- invention --.
Column 5, line 71, "three" should read -- these --. Column 7, line 51, "colars" should read -- collars --.

Signed and sealed this 13th day of January 1970.

(SEAL)
Attest:

Edward M. Fletcher, Jr.                      WILLIAM E. SCHUYLER, JR.
Attesting Officer                                    Commissioner of Patents